(12) United States Patent
Le Tanou

(10) Patent No.: US 9,888,254 B2
(45) Date of Patent: Feb. 6, 2018

(54) METHOD FOR SELECTING AT LEAST ONE ENCODING PARAMETER IN A VIDEO ENCODER, WITH A SUPPLEMENTARY SMOOTHNESS CONSTRAINT

(71) Applicant: ENVIVIO FRANCE, Saint Jacques de la Lande (FR)

(72) Inventor: Julien Le Tanou, Rennes (FR)

(73) Assignee: ENVIVIO FRANCE, Saint Jacques de la Lande (FR)

( * ) Notice: Subject to any disclaimer, the term of this patent is extended or adjusted under 35 U.S.C. 154(b) by 114 days.

(21) Appl. No.: 14/745,005

(22) Filed: Jun. 19, 2015

(65) Prior Publication Data

US 2015/0373367 A1 Dec. 24, 2015

(30) Foreign Application Priority Data

Jun. 19, 2014 (FR) ...................................... 14 55665

(51) Int. Cl.
*H04N 19/147* (2014.01)
*H04N 19/19* (2014.01)
(Continued)

(52) U.S. Cl.
CPC ......... *H04N 19/521* (2014.11); *H04N 19/107* (2014.11); *H04N 19/109* (2014.11);
(Continued)

(58) Field of Classification Search
CPC .... H04N 19/109; H04N 19/124; H04N 19/13; H04N 19/44; H04N 19/521; H04N 19/61;
(Continued)

(56) References Cited

U.S. PATENT DOCUMENTS

2007/0019724 A1* 1/2007 Tourapis .............. H04N 19/105
375/240.12
2008/0025397 A1* 1/2008 Zhao .................... H04N 19/172
375/240.13

(Continued)

FOREIGN PATENT DOCUMENTS

WO 2013074365 A1 5/2013
WO WO 2013074365 A1 * 5/2013 ....... H04N 19/00909

OTHER PUBLICATIONS

French Search Report and Written Opinion dated Mar. 4, 2015 for corresponding French Patent Application No. FR1455665, filed Jun. 19, 2014.

(Continued)

*Primary Examiner* — Christopher S Kelley
*Assistant Examiner* — Kathleen Walsh
(74) *Attorney, Agent, or Firm* — David D. Brush; Westman Champlin & Koehler, P.A.

(57) ABSTRACT

A method is proposed of selection, for a current image portion to be encoded and for at least one encoding module included in a video encoder, of at least one encoding parameter from amongst a set of encoding parameters available for the at least one encoding module. The method is based on a decision model defining a minimization, under a rate constraint, of a first measurement of distortion between source samples, included in the current image portion to be encoded, and current reconstructed samples, included in a current reconstructed image portion, obtained from the current image portion to be encoded. The decision model defines the minimization under an additional smoothness constraint, pertaining to a second measurement of distortion between the current reconstructed samples and preceding reconstructed samples, belonging to a temporal reference neighborhood comprising at least one preceding recon- (Continued)

Figure 1:
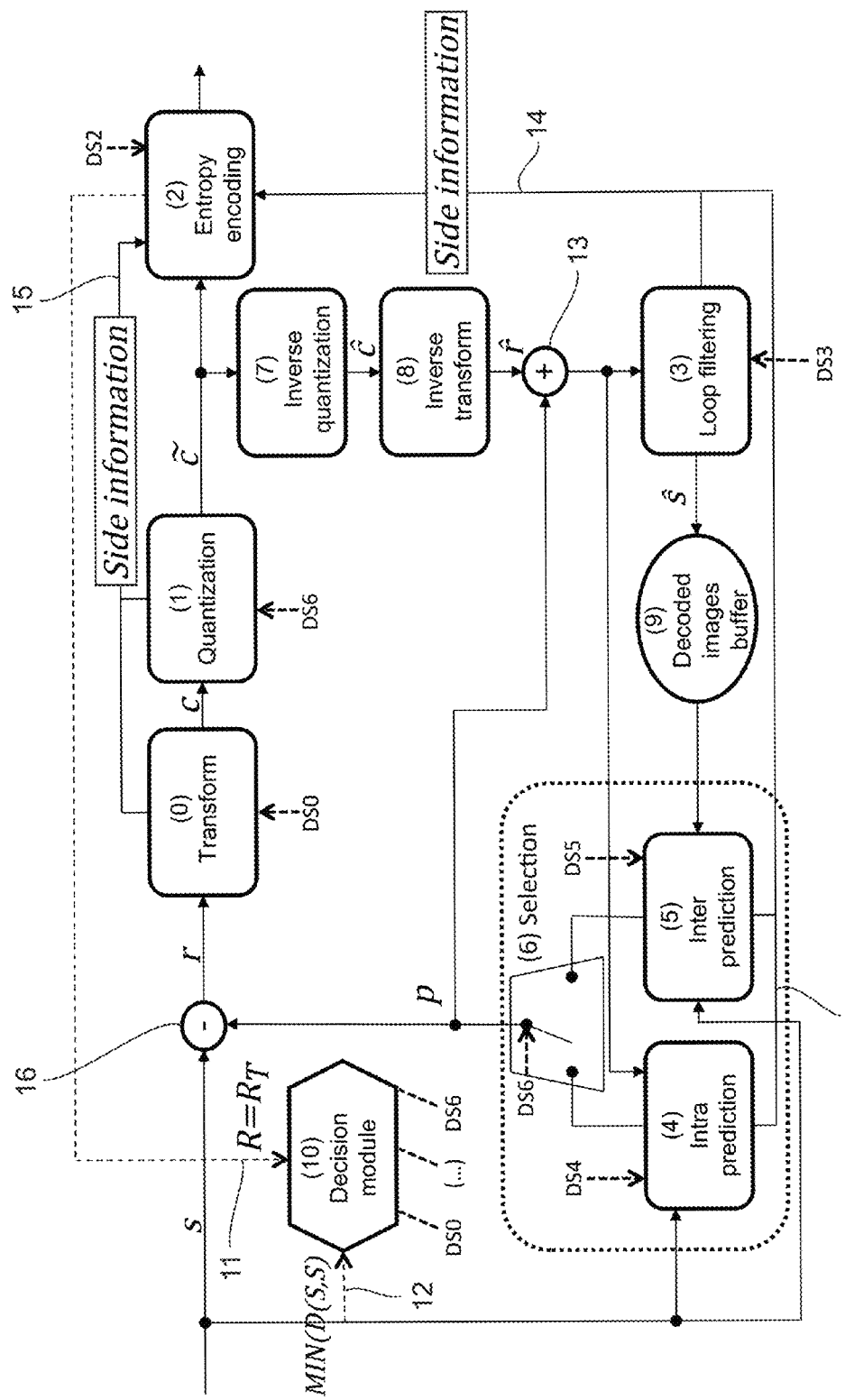

structed image portion obtained from at least one preceding encoded image portion.

8 Claims, 7 Drawing Sheets

(51) Int. Cl.
H04N 19/109 (2014.01)
H04N 19/11 (2014.01)
H04N 19/513 (2014.01)
H04N 19/176 (2014.01)
H04N 19/124 (2014.01)
H04N 19/13 (2014.01)
H04N 19/44 (2014.01)
H04N 19/107 (2014.01)
H04N 19/117 (2014.01)
H04N 19/12 (2014.01)
H04N 19/567 (2014.01)
H04N 19/61 (2014.01)

(52) U.S. Cl.
CPC .......... *H04N 19/11* (2014.11); *H04N 19/117* (2014.11); *H04N 19/12* (2014.11); *H04N 19/124* (2014.11); *H04N 19/13* (2014.11); *H04N 19/147* (2014.11); *H04N 19/176* (2014.11); *H04N 19/19* (2014.11); *H04N 19/44* (2014.11); *H04N 19/567* (2014.11); *H04N 19/61* (2014.11)

(58) Field of Classification Search
CPC .... H04N 19/107; H04N 19/11; H04N 19/117; H04N 19/12; H04N 19/147; H04N 19/176; H04N 19/19; H04N 19/567
USPC ..................................................... 375/240.12
See application file for complete search history.

(56) References Cited

U.S. PATENT DOCUMENTS

2013/0182971 A1* 7/2013 Leontaris ................ G06T 5/002
    382/275
2014/0321552 A1* 10/2014 He ................... H04N 19/00909
    375/240.16
2014/0328388 A1* 11/2014 Kim ..................... H04N 19/105
    375/240.02

OTHER PUBLICATIONS

Sullivan G J et al: "Rate-Distortion Optimization for Video Compression", IEEE Signal Processing Magazine, IEEE Service Center, Piscataway, NJ, US, vol. 15, No. 6, May 11, 1998 (May 11, 1998), pp. 74-90, XP011089821.

Changuel N et al: "Predictive control for efficient statistical multiplexing of digital video programs", Packet Video Workshop, 2009, PV 2009. 17th International, IEEE, Piscataway, NJ, USA, May 11, 2009 (May 11, 2009), pp. 1-9, XP031483137.

* cited by examiner

METHOD FOR SELECTING AT LEAST ONE ENCODING PARAMETER IN A VIDEO ENCODER, WITH A SUPPLEMENTARY SMOOTHNESS CONSTRAINT

1. FIELD OF THE DISCLOSURE

The field of the disclosure is that of the compression of video data. The goal of video compression is to reduce the quantity of data contained in a video sequence while at the same time preserving the originally perceived visual quality; and thus reducing the costs of storage and transmission of the video data considered. Video data contains a very large amount of statistical redundancy, in both the time domain and the space domain. The compression techniques make use of this statistical redundancy, i.e. the correlation between the pixels forming a sequence of images, by using advanced prediction mechanisms, in order to reduce the quantity of data to be stored or transmitted.

More specifically, the disclosure relates to a technique of selection, for a current portion of an image to be encoded and for at least one encoding module included in a video encoder, of at least one encoding parameter from amongst a set of available encoding parameters for said at least one encoding module.

2. TECHNOLOGICAL BACKGROUND

In the case of the widely used hybrid video encoder, we can distinguish mainly two classes of prediction (or encoding): intra-prediction methods and inter-prediction methods. Intra prediction uses the correlation between pixels belonging to a same spatial neighborhood (i.e. within a same image, the intra image) while inter prediction uses the correlation between pixels belonging to a same temporal neighborhood (i.e. between several images that are temporal neighbors, known as the inter image). Each image is processed sequentially and generally in blocks (processing by blocks is non-exhaustive and the present description holds true for any image portion whatsoever). For each block, after intra or inter prediction of the source samples, the residual samples (derived from the difference between the source samples and the predicted samples) are successively converted, quantized and encoded by means of entropy encoding.

FIG. 1 presents a generic block diagram of an example of a known hybrid video encoder (i.e. forming part of the prior art). The dashed arrows referenced 11 and 12 represent the criteria of optimization (on the one hand "R=$R_T$" and on the other hand "MIN(D(s,ŝ))", as described in detail further below) used by a decision module (also called a "decision-making module") 10. The dashed arrows referenced DS0 and DS6 represent the output decisions sent to the different encoding modules controlled by the decision-making module 10. Each encoding module controlled by the decision module is numbered 0 to 6, and the associated output decision is indexed by the same number, preceded by "DS". The arrows referenced 14 and 15 represent secondary pieces of information provided to the different encoding modules controlled by the decision module 10.

For a sequence of images to be encoded, each source image portion (current image portion to be encoded, in a current image to be encoded) passes through all the encoding modules represented. The source samples s are first of all predicted by means of a prediction circuit 600 (comprising in this example an intra prediction module 4, an inter prediction module 5 and a selection module 6). The result of the prediction is a set of predicted modules p, which is subtracted from the source modules (by a subtraction module 16) leading to residual samples r. The residual samples are successively transformed (by a transformation module 0), quantized (by a quantization module 1), encoded by means of an entropy encoding (by an entropy encoding module 2) then transmitted to the decoder. The decoding loop is reproduced at the encoder in order to reconstruct the encoded samples, available to the decoder, and in order to use them as a reference for the prediction. Thus, the quantized converted residual samples č (at output of the quantification module 1) are successively de-quantized (by an inverse quantization module 7), de-transformed (by an inverse transformation module 8), summated with the predicted samples (by an addition module 13) and if necessary post-filtered (by a loop filtering module 3). The resulting reconstructed modules ŝ are then stored in the memory (buffer memory 9) to be used during the prediction step.

During the compression process, the decision module 10 takes a decision for at least one of the encoding modules 0 to 6 passed through. The taking of a decision consists of the selection of at least one encoding parameter (also called an "encoding mode") from amongst a set of encoding parameters available for the encoding module considered. In the case of the transformation module 0, the decision module can be used to select for example the size or the type of transform applied to the residual samples; in the case of the quantization module 1, to select for example the quantization parameters (for example quantization pitch, threshold, dead zone, matrices, etc.); in the case of the entropy encoding module 2, to select the type of entropy encoding; in the case of the loop filtration module 3, to select for example the loop filtering parameters (for example, the strength of the deblocking filter, offsets, classification in the "sample adaptive offset (HEVC/H.265)" filter, etc.); in the case of the intra prediction module 4, to select for example the intra prediction mode (for example "DC", "planar", different modules of angular prediction, etc.); in the case of the inter prediction 5 module, to select for example the motion vectors and/or motion predictors; in the case of the selection module 6, to select for example the prediction mode (for example intra/inter prediction mode) and/or the size of the prediction unit.

In short, for each block (or image portion) of each image of a video sequence, numerous decisions (selections of encoding parameters) must be made by the video encoder in order to optimize the efficiency of encoding of this video sequence. The decision model (also called a decision model) used to optimize these decisions (selections of encoding parameters) is left free for the encoder (not standardized).

A prior-art decision model, used by the decision module 10 and implemented in the majority video encoders is based on the optimizing of the rate-distortion trade-off. The goal of such a decision model is to minimize the distortion D under constraint of a rate $R_T$, where the distortion is a measurement of distance between the source video samples, s, and the reconstructed video samples, ŝ, for example:

$$\text{MIN}(D(s,ŝ)), \text{ under the constraint } R=R_T$$

Various known methods are used to resolve this classic problem of optimizing under constraint. For example, if the Lagrange multiplier method is used, this classic problem of optimization under constraint can be rewritten in the form of a single minimization, such that:

for each block (or image portion) of each image, for at least one encoding module and one set of encoding parameters, M={$m_i$}, i∈{0,K−1}, K≥2, associated with this encoding module, a search is made for the optimal encoding parameter $m_{opt}$ that minimizes:

$$\begin{cases} m_{opt} = \underset{m \in M}{\operatorname{argmin}}(J_m) \\ J_m = D(s, \hat{s}_m) + \lambda \times R(\tilde{c}_m, \rho_m) \end{cases} \quad (1)$$

Where:

$J_m$ is the Lagrangian cost for the encoding parameter m;

$D(s,\hat{s}_m)$ is a measurement of distortion between the source samples, s, and the reconstructed samples, $\hat{s}_m$, for the encoding parameter m;

$R(\tilde{c}_m,\rho_m)$ is an estimation of the cost in bits of the quantized transformed residues, $\tilde{c}_m$, and of the secondary information, $\rho_m$, to be transmitted to the decoder for the encoding parameter m;

$\lambda$ is the Lagrange multiplier defining a trade-off between distortion and rate.

It will be understood from the equation (1) that for a target rate R and an encoding parameter m, and whatever the type of measurement of distortion D used (in particular any metric whatsoever with perceptual properties, for example based on a measurement of similarity of the structures of the image), the process of optimization orients the decisions so as to remain as close as possible to the source samples only. Perceptually, for most of the video contents, because of the quantization step (i.e. step with loss of data), this optimizing criterion based on a minimizing of the distance to the characteristics of the source without an additional constraint is insufficient.

Indeed, for source blocks belonging to image zones with similar characteristics, i.e. zones having a high spatial correlation and/or temporal correlation, the process of compression based on the preceding decision model can lead to reconstructed blocks with different characteristics and with a significant loss of correlation between the spatially and/or temporally neighboring reconstructed blocks. The samples are thus reconstructed in an irregular or unsmooth manner, spatially and/or temporally. The phenomenon is visually very unpleasant; in particular, temporally, through several successive images, where flickering artifacts or other artifacts of loss of temporal consistency appear. The combination of the successive choice of different encoding parameters (with different properties) and of the loss of residual information resulting from the quantization explains this phenomenon.

The prevention of this visual artifact has motivated the present invention described here below.

3. SUMMARY

One particular embodiment of the disclosure proposes a method of selection, for a current image portion to be encoded and for at least one encoding module included in a video encoder, of at least one encoding parameter from amongst a set of encoding parameters available for said at least one encoding module, the method being based on a decision model defining a minimization, under a bit-rate constraint, of a first measurement of distortion D between source samples, included in said current image portion to be encoded, and current reconstructed samples, included in a current reconstructed image portion, obtained from the current image portion to be encoded. The decision model defines said minimization under an additional smoothness constraint, pertaining to a second measurement of distortion D' between said current reconstructed samples and preceding reconstructed samples, belonging to a temporal reference neighborhood comprising at least one preceding reconstructed image portion obtained from at least one preceding encoded image portion.

Thus, the proposed technique relies on a wholly novel and inventive approach to the optimizing of encoding decisions (i.e. for the selection of the encoding parameters): in order to meet the perceived visual quality of the compressed video contents, the prior-art optimization criteria (i.e. the minimizing of the measurement of distortion between the source samples and the reconstructed samples, under rate constraint) are made complete with an additional constraint (called a smoothness constraint) relating to a measurement of distortion between the current reconstructed samples and preceding reconstructed samples belonging to a temporal reference neighborhood.

The proposed technique improves the efficiency of compression of the video encoder and the perceived visual quality of the encoded video sequences. It enables smooth reconstruction of the encoded video samples. Indeed, by improving the coherence and the consistency (temporal) of the reconstructed samples, it reduces the visual artifacts (such as flickering artifacts).

According to one particular aspect of the disclosure, said additional smoothness constraint, pertaining to the second measurement of distortion D', is defined by: $D'(\hat{s}_N,\hat{s}) \leq D'_T$, with $D'_T$ being a predetermined threshold, $\hat{s}$ being the current reconstructed samples, and $\hat{s}_N$ being the preceding reconstructed samples.

In this way, the additional smoothness constraint is defined in a simple way.

According to one particular characteristic, the decision model defines said minimization as follows, by means of the Lagrange multiplier method:

for each portion of each image, for at least one encoding module and one set of encoding parameters $M=\{m_i\}$, $i \in \{0, K-1\}$, $K \geq 2$ associated with this encoding module, a search is made for the optimal encoding parameter $m_{opt}$ which minimizes:

$$\begin{cases} m_{opt} = \underset{m \in M}{\operatorname{argmin}}(J_m) \\ J_m = D(s, \hat{s}_m) + \mu \times D'(\hat{s}_N, \hat{s}_m) + \lambda \times R(\tilde{c}_m, \rho_m) \end{cases}$$

where:

$D(s,\hat{s}_m)$ is a measurement of distortion between source samples, s, and current reconstructed samples, $\hat{s}_m$, for the encoding parameter m;

$D'(\hat{s}_N,\hat{s}_m)$ is a measurement of distortion between preceding reconstructed samples, $\hat{s}_N$, belonging to a temporal reference neighborhood, N, and the current reconstructed samples, $\hat{s}_m$, for the encoding parameter m;

$R(\tilde{c}_m,\rho_m)$ is an estimation of a cost in bits of quantized transformed residues, $\tilde{c}_m$, and of a secondary piece of information, $\rho_m$, to be transmitted to a decoder for the encoding parameter m;

$\mu$ is a first Lagrange multiplier defining a trade-off between $D(s,\hat{s}_m)$ and $D'(\hat{s}_N,\hat{s}_m)$; and $\lambda$ is a second Lagrange multiplier, defining a trade-off between $D(s,\hat{s}_m)$ and $D'(\hat{s}_N,\hat{s}_m)$ on the one hand and $R(\tilde{c}_m,\rho_m)$ on the other hand.

According to one particular characteristic, said at least one encoding parameter belongs to the group comprising:

a size or a type of transform applied to residual samples, when said at least one encoding module is a transformation module;

parameters of quantization when said at least one encoding module is a quantization module;

a type of entropy encoding when said at least one encoding module is an entropy encoding module;

loop filtering parameters when said at least one encoding module is a loop filtering module;

an intra prediction mode when said at least one encoding module is an intra prediction module;

motion vectors and/or motion predictors when said at least one encoding module is an inter prediction module;

a mode of prediction and/or a size of prediction unit when said at least one encoding module is a selection module for selection from amongst several prediction modules.

This list is of encoding parameters (and/or associated encoding modules) is not exhaustive.

According to one particular characteristic, the reference neighborhood comprises at least one preceding reconstructed image portion belonging to the group comprising:

at least one first preceding reconstructed image portion obtained from a preceding encoded image portion which, in a first preceding encoded image, occupies a position identical to that of the current image portion to be encoded in a current image to be encoded;

at least one second preceding reconstructed image portion which, in said first preceding encoded image, occupies a position adjacent to that of said at least one first preceding reconstructed image portion;

at least one third preceding reconstructed image portion obtained from a motion-compensated image portion which, in a second preceding encoded image portion, occupies a motion-compensated position, by means of a motion vector, relative to the position of the current image portion to be encoded in a current image to be encoded;

at least one fourth preceding reconstructed image portion which, in the second preceding encoded image portion, occupies a position adjacent to that of said at least one third preceding reconstructed image portion.

The reference neighborhood can comprise one or more of these preceding reconstructed image portions.

According to one particular characteristic, the reference neighborhood comprises at least two preceding reconstructed image portions and the second measurement of distortion D' is defined as a weighted sum of a plurality of intermediate distortion measurements, each intermediate distortion measurement being associated with one of said at least two preceding reconstructed image portions and being defined as a measurement of distortion between said current reconstructed samples included in the current reconstructed image portion and preceding reconstructed samples belonging to the preceding reconstructed image portion associated with said intermediate distortion measurement.

Thus, with a reference neighborhood comprising several preceding reconstructed image portions, the smooth reconstruction of the encoded video samples is further improved.

According to one particular characteristic, said weighted sum is defined by a set of weighting coefficients that is variable from one encoding parameter to another within said set of available encoding parameters for said at least one encoding module.

Thus, the computations are optimized by enabling each of the available encoding parameters to be associated with a distinct reference neighborhood.

In another embodiment of the disclosure, there is proposed a computer program product comprising program code instructions for implementing the above-mentioned method (in any one of its different embodiments) when said program is executed on a computer.

In another embodiment of the disclosure, there is proposed a computer-readable and non-transient storage medium storing a computer program comprising a set of instructions executable by a computer to implement the above-mentioned method (in any one of its different embodiments).

Another embodiment of the disclosure proposes a device for the selection, for a current image portion to be encoded and for at least one encoding module included in a video encoder, of at least one encoding parameter from amongst a set of encoding parameters available for said at least one encoding module, the selection device comprising means for implementing a decision model defining a minimizing, under a bit-rate constraint, of a first measurement of distortion D between source samples, included in said current image portion to be encoded, and current reconstructed samples, included in a current reconstructed image portion obtained from the current image portion to be encoded. The means for implementing the decision model define said minimization under an additional smoothness constraint relating to a second measurement of distortion D' between said current reconstructed samples and preceding reconstructed samples belonging to a temporal reference neighborhood comprising at least one preceding reconstructed image portion obtained from at least one preceding encoded image portion.

Advantageously, the selection device comprises means for implementing the steps that it performs in the method for selecting as described here above in any one of its different embodiments.

4. LIST OF FIGURES

Figure 2:
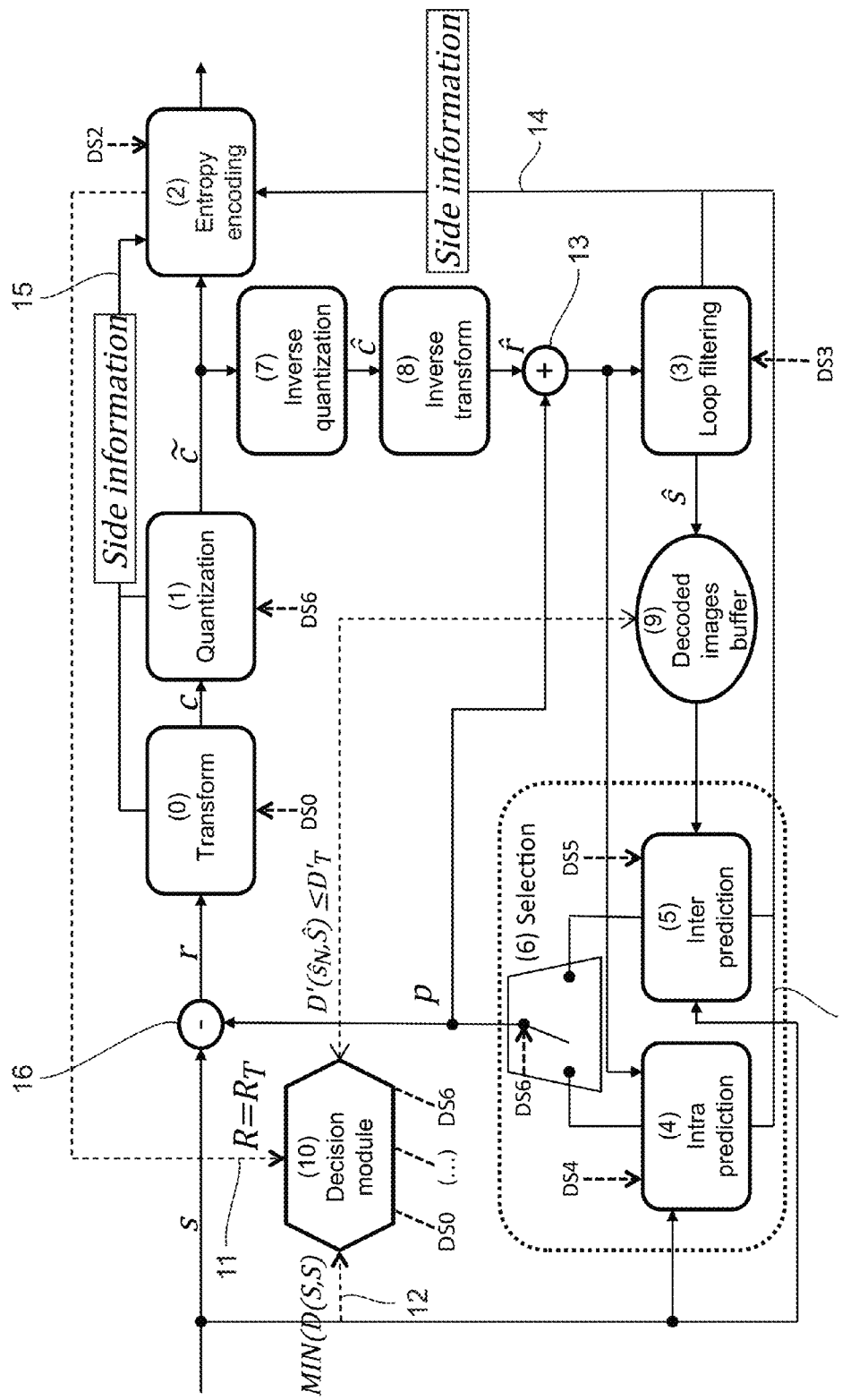
Figure 3:
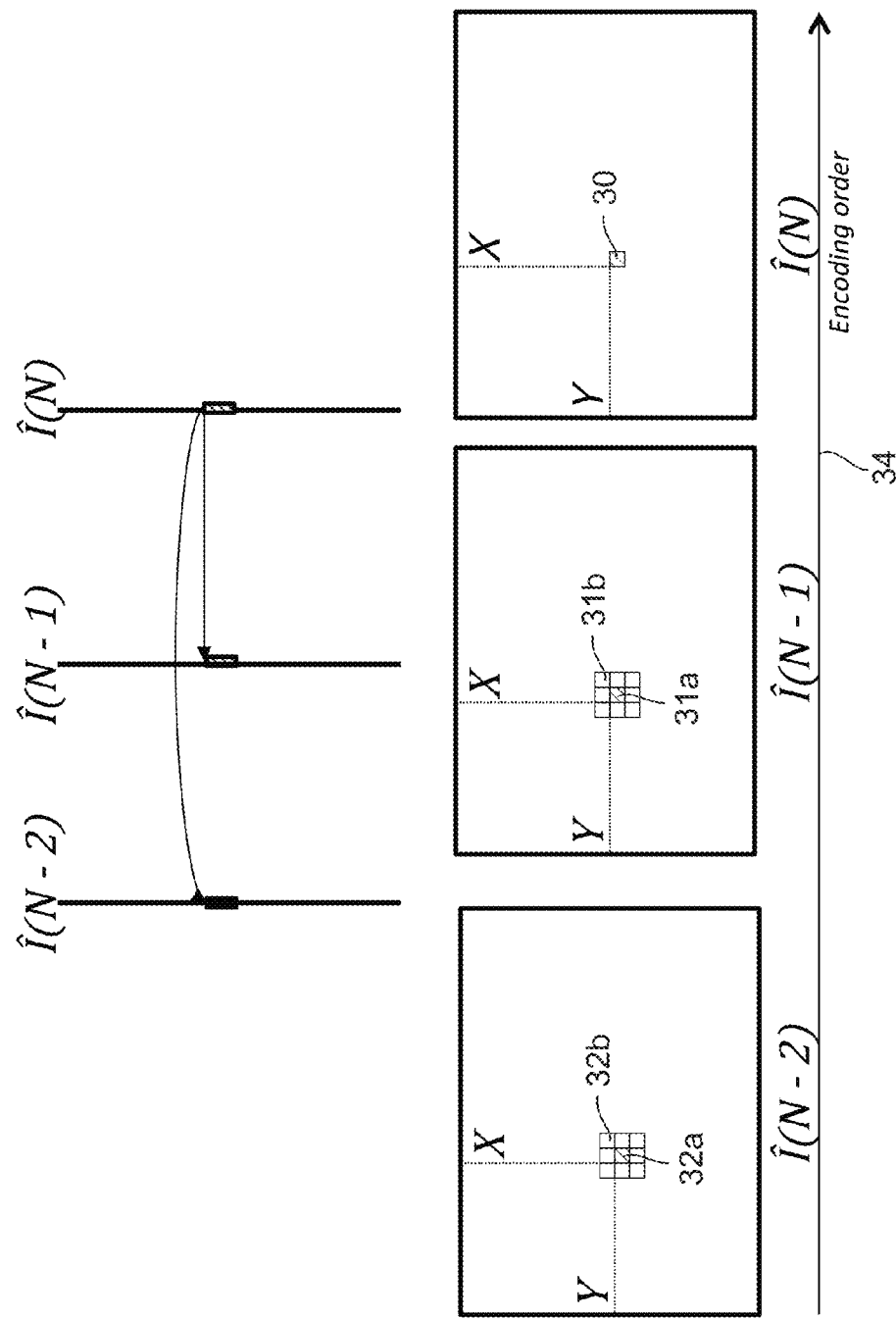
Figure 4:
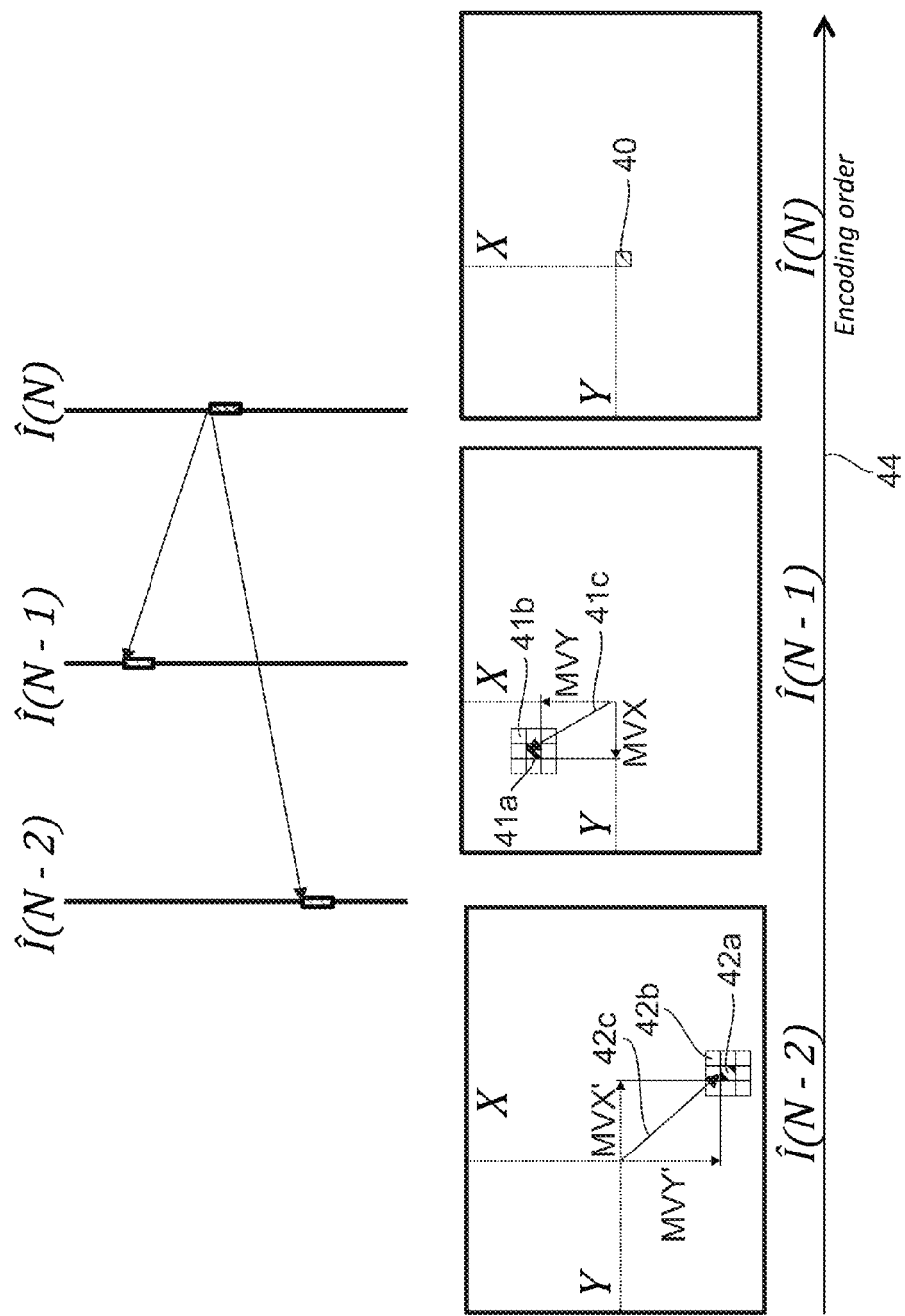
Figure 5:
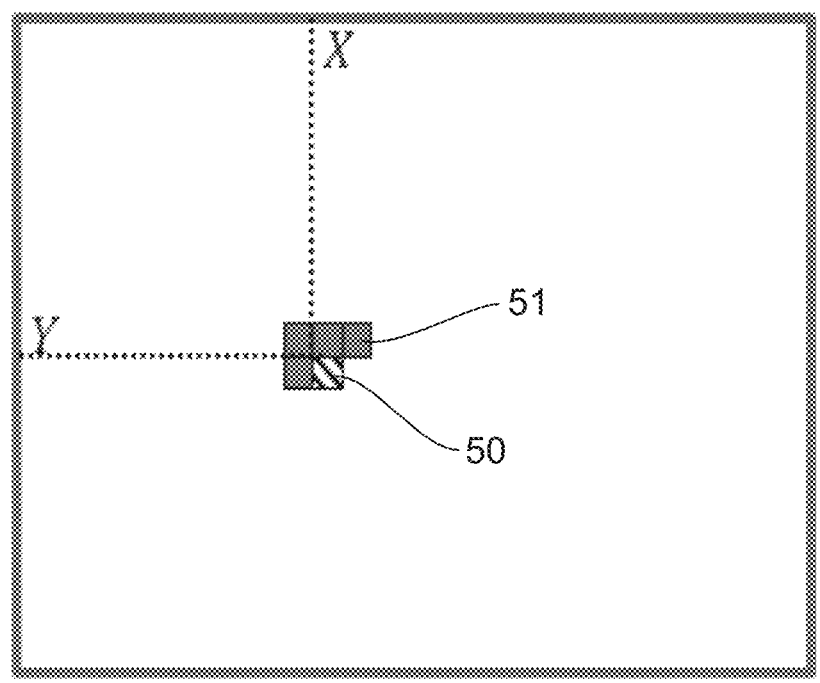
Figure 6:
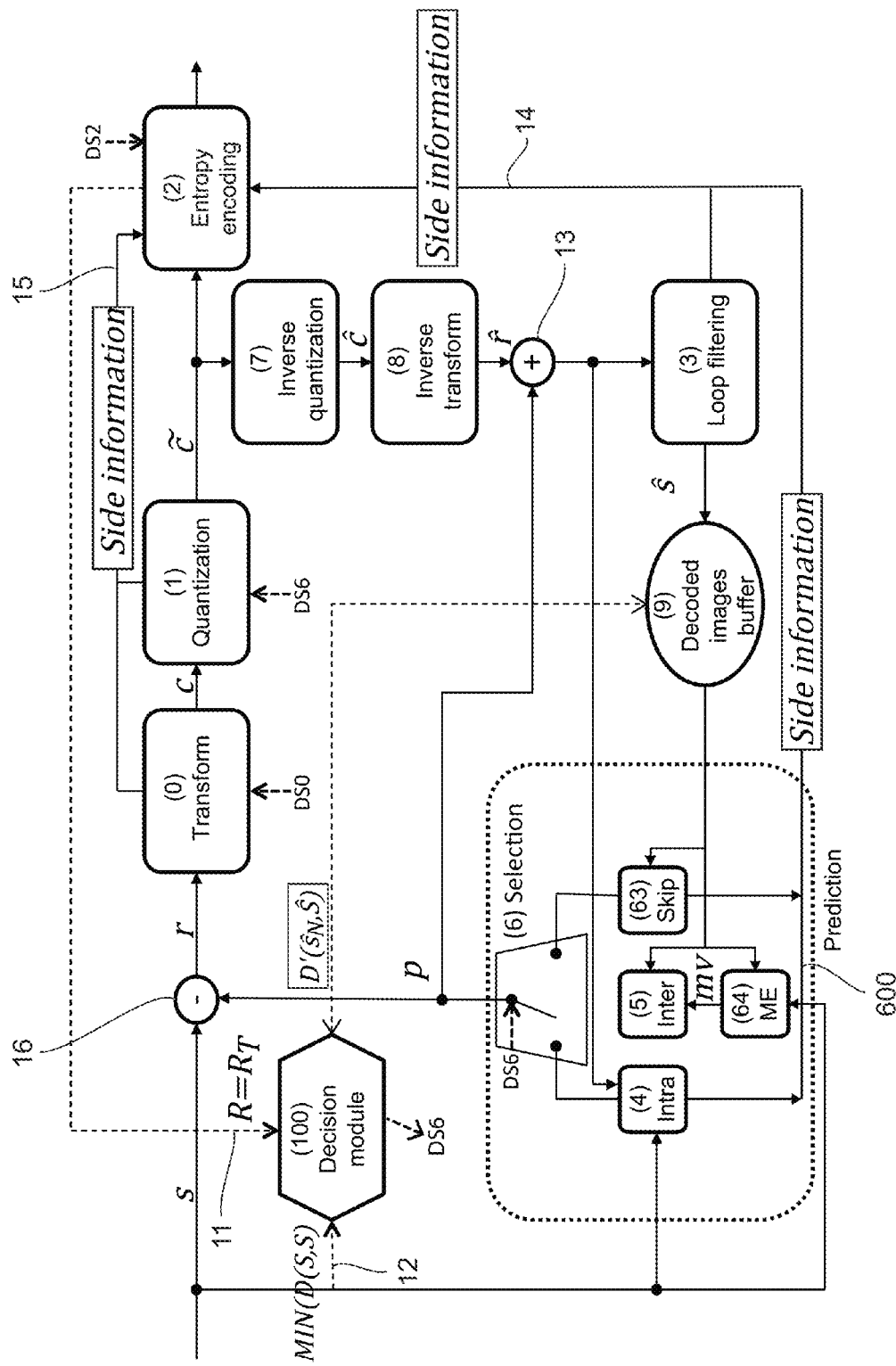
Figure 7:
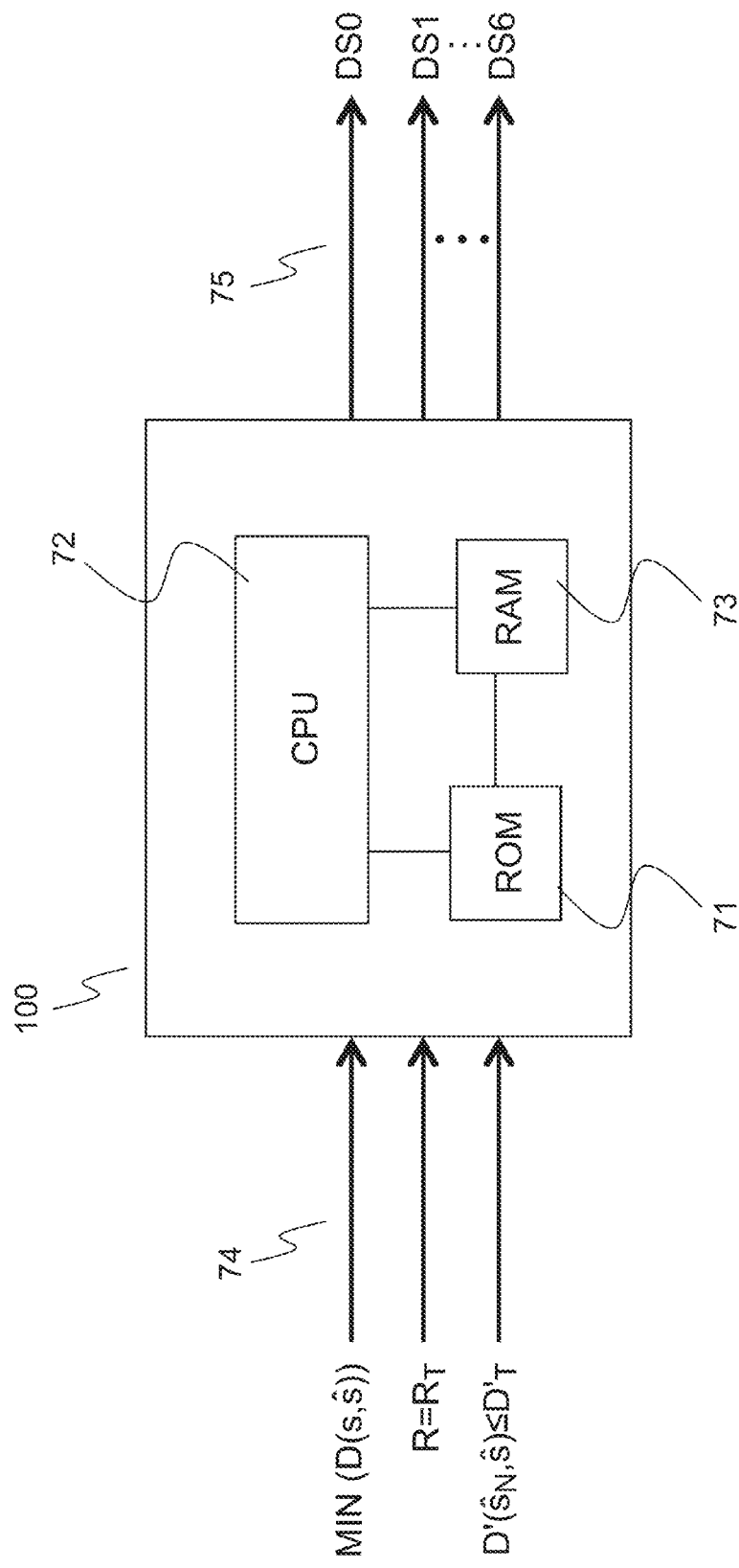

Other features and advantages of the invention shall appear from the following description, given by way of a non-exhaustive and indicative example, and from the appended drawings, of which:

FIG. 1, already described with reference to the prior art, is a block diagram of a hybrid video encoder of the prior art;

FIG. 2 is a block diagram of a hybrid video encoder according to a first particular embodiment of the disclosure;

FIG. 3 presents a first example of a reference neighborhood;

FIG. 4 presents a second example of a reference neighborhood;

FIG. 5 presents a third example of a reference neighborhood;

FIG. 6 is a block diagram of a video hybrid encoder according to a second particular embodiment of the disclosure; and FIG. 7 shows the structure of a decision module (a device for selecting encoding parameters) according to one particular embodiment of the disclosure.

5. DETAILED DESCRIPTION

In all the figures of the present document, the identical elements and steps are designated by a same numerical reference.

Here below in the description, we shall consider by way of an example only and in order to facilitate the reading, that an image portion is an image block, in the sense for example of a macroblock (MB) in MPEG-2/AVC-H.264, or again a coding unit (CU) in HEVC-H.265. It is clear that the present disclosure can be applied regardless of the nature of the image portion to be encoded.

Referring now to FIG. 2, we present a hybrid video encoder according to a first embodiment of the disclosure.

This encoder is distinguished from the prior-art encoder of FIG. 1 in that the decision module (referenced 100 in FIG. 2) uses the criterion of additional optimization, namely an additional "smoothness constraint" which is written for example as: "D'($\hat{s}_N,\hat{s}$)≤D'$_T$" (see detailed presentation here below). This additional optimization criterion represented in FIG. 2 by the dashed arrow referenced 20 is therefore used in addition to those already used by the decision module 10 of FIG. 1, namely "R=R$_T$" and "MIN(D(s,$\hat{s}$))".

As already mentioned further above, the proposed technique is based on the following assumption: in order to meet the perceived visual quality of the compressed video contents, an addition smoothness constraint must be considered for optimizing the encoding decisions (i.e. for optimizing the selection of encoding parameters).

The additional smoothness constraint relates to the measurement of distortion between the current reconstructed samples (i.e. reconstructed with the current candidate encoding parameter for a current block of images to be encoded) and the preceding reconstructed samples belonging to a temporal reference neighborhood (i.e. belonging to previously encoded and reconstructed blocks).

In other words, the decision module 100 executes a process of selection, for a current block to be encoded and for at least one encoding module (0 to 6) included in the video encoder, of at least one encoding parameter from amongst a set of encoding parameters available for this encoding module. The method is based on a decision model defining a minimizing of the first distortion measurement D (between source samples, included in the current image block to be encoded and current reconstructed samples included in a current reconstructed image block obtained from the current image block to be encoded):
under a bit-rate constraint, and
under an additional smoothness constraint relating to a second measurement of distortion D' between the current reconstructed samples and the preceding reconstructed samples belonging to a reference neighborhood comprising at least one preceding reconstructed image block obtained from at least one preceding encoded image block.

The additional smoothness constraint makes the prior-art criteria of optimization (i.e. the minimizing of the measurement of distortion between the source samples and reconstructed samples as well as the rate constraint) complete so that the optimization problem becomes:

MIN($D(s,\hat{s})$), under the constraints $R=R_T$ et $D'$($\hat{s}_N,\hat{s}$)≤$D'_T$ (2)

with D' as a distortion measurement, D'$_T$ as a threshold on this measurement and $\hat{s}_N$ as the preceding reconstructed samples belonging to a temporal reference neighborhood N.

Using the method of the Lagrange multipliers (non-exhaustive example, other known methods of optimization under constraint can be used), the problem of optimizing can be rewritten as follows:
for each block of each image, for at least one encoding module and a set of encoding parameters M={m$_i$}, i∈{0, K−1}, K≥2 associated with this encoding module, a search is made for an optimal encoding parameter m$_{opt}$ which minimises:

$$\begin{cases} m_{opt} = \underset{m \in M}{\arg\min}(J_m) \\ J_m = D(s, \hat{s}_m) + \mu \times D'(\hat{s}_N, \hat{s}_m) + \lambda \times R(\tilde{c}_m, \rho_m) \end{cases}$$ (2)

where:

$D(s,\hat{s}_m)$ is the measurement of distortion between the source samples, s, and the current reconstructed samples, $\hat{s}_m$, for the encoding parameter m;

$D'(\hat{s}_N,\hat{s}_m)$ is a measurement of distortion between the preceding reconstructed samples, $\hat{s}_N$, belonging to a temporal reference neighborhood, N, and the current reconstructed samples, $\hat{s}_m$, for the encoding parameter m;

$R(\tilde{c}_m,\rho_m)$ is an estimation of the cost in bits of quantized transformed residues, $\tilde{c}_m$, and the secondary information, $\rho_m$, to be transmitted to the decoder for the encoding parameter m;

μ is a first Lagrange multiplier, defining a trade-off between $D(s,\hat{s}_m)$ and $D'(\hat{s}_N,\hat{s}_m)$; and λ is a second Lagrange multiplier defining a trade-off between distortion (i.e. $D(s,\hat{s}_m)$ and $D'(\hat{s}_N,\hat{s}_m)$) and rate (i.e. $R(\tilde{c}_m,\rho_m)$).

The metric D' can be different or not different from the metric D. It can be any metric (for example the sum of the squares of the differences (SSD), the sum of the absolute differences (SAD), image portion mean difference), structural similarity index, etc.) and applied to the luminance and/or chrominance components.

With the decision model proposed, it will be understood from the equation (2) that a penalty is naturally assigned to the resultant encoding parameters in current reconstructed samples that are too far (in the sense of D') from the preceding reconstructed samples belonging to the reference neighborhood N. This penalty provides for a smooth reconstruction throughout the neighborhood up to the current block to be encoded.

For each block to be encoded and for each encoding parameter m to be assessed for one of the encoding modules, the reference neighborhood N of reconstructed samples can be constructed as one of the following three types of neighborhood (or a combination of several of them).

A first type of neighborhood (temporal message) consists of one or more preceding reconstructed blocks corresponding, for at least one preceding encoded image, to the collocated block in said preceding encoded image, and possibly one or more blocks adjacent to this one (i.e. the collocated block) in said preceding encoded image.

An example of a neighborhood of this first type is given in FIG. 3. The current block to be encoded 30 (shown in hatched form) is included in the current image to be encoded Î(N). More specifically, its upper left angle is in the position (X,Y). The temporal neighborhood comprises preceding reconstructed blocks, obtained from preceding encoded blocks included in the preceding encoded images Î(N−1) and Î(N−2), the reference module 34 presenting the encoding order. More specifically, the temporal neighborhood comprises:

a preceding reconstructed block (referenced 31a) obtained from the preceding encoded block collocated in the preceding encoded image Î(N−1) (i.e. occupying in this image, a position identical to that of the current block to be encoded 30 in the current image to be encoded Î(N)), and eight other preceding reconstructed blocks (comprehensively referenced 31b) adjacent in the preceding encoded image Î(N−1) with the preceding reconstructed block referenced 31a;

a preceding reconstructed block (referenced 32*a*) obtained from the preceding encoded block collocated in the preceding encoded image Î(N−2) (i.e. occupying a position herein that is identical to that of the current block to be encoded 30 in the current image to be encoded Î(N)), and eight other preceding reconstructed blocks (comprehensively referenced 32*b*) adjacent in the preceding encoded image Î(N−2) with the preceding reconstructed block referenced 32*a*.

A second type of (temporal) neighborhood is formed by one or more preceding reconstructed blocks corresponding, for at least one preceding encoded image, to the motion-compensated block in said preceding encoded image and possibly one or more blocks adjacent to it (i.e. the motion-compensated block in said preceding encoded image, and possibly one or more adjacent blocks adjacent to it (i.e. the motion-compensated block) in said preceding encoded image.

An example of neighborhood of this second type is given in FIG. 4. The current block to be encoded 40 (hashed) is included in the current image to be encoded Î(N). More specifically, its upper left-hand corner in the position (X,Y). The temporal neighborhood comprises preceding reconstructed blocks obtained from previously encoded blocks included in the preceding encoded images Î(N−1) and Î(N−2), the arrow referenced 44 representing the encoding order. More specifically, the temporal neighborhood comprises:

a preceding reconstructed block (referenced 41*a*) obtained from the motion-compensated block in the preceding encoded image Î(N−1) (i.e. occupying in this image a motion-compensated motion (X+MVX, Y+MVY) by means of a motion vector MV=(MVX, MVY) (referenced 41*c*), the components (MVX, MVY) of which are signed) relative to the position (X,Y) of the current block 40 to be encoded in the current image to be encoded Î(N)), and eight other preceding reconstructed blocks (comprehensively referenced 41*b*) adjacent in the preceding encoded image Î(N−1) to the preceding reconstructed block referenced 41*a*;

a preceding reconstructed block (referenced 42*a*) obtained from the motion-compensated block in the preceding encoded image Î(N−2) (i.e. occupying a motion-compensated position in it (X+MVX', Y+MVY') by means of the motion vector MV'=(MVX', MVY') (referenced 42*c*, the components (MVX', MVY') of which are signed) relative to the position (X,Y) of the current block 40 to be encoded in the current image to be encoded Î(N)), and eight other preceding reconstructed blocks (comprehensively referenced 42*b*) adjacent in the preceding encoded image Î(N−2) to the preceding reconstructed message referenced 42*a*.

A third type of (spatial) neighborhood is formed by one or more preceding reconstructed blocks corresponding to one or more already encoded blocks which are adjacent, in the current image to be encoded, to the current block to be encoded.

An example of a neighborhood of this third type is given in FIG. 5. The current block to be encoded 50 (hashed) is included in the current image to be encoded Î(N). The spatial neighborhood comprises four preceding reconstructed blocks (comprehensively referenced 51), obtained from four preceding encoded blocks which, in the current encoded image Î(N), occupy positions adjacent to that of the current block 50 to be encoded (top-left position, top-center position, top-right position and left position).

It can be noted that depending on the encoding structure used for a group of images or pictures to be encoded (called a GOP or Group-Of-Pictures), especially in using a GOP structure known as a bidirectional structure, the temporal neighborhood can belong to past and/or future images in the order of display.

Referring now to FIG. 6, we present a hybrid video encoder according to a second particular embodiment of the disclosure.

This encoder can be distinguished from the encoder of FIG. 2 (first embodiment of the disclosure) in that the prediction circuit (referenced 600' in FIG. 6) comprises an intra prediction module 4, an inter prediction module 5, a skip prediction module 63, a motion estimation module (ME) 64 and a selection module 6 (used to select one of the three prediction modules 4, 5 and 63).

It is assumed for example that the video encoder is of the MPEG type. In the context of the MPEG video standards, for each image block (i.e. MB or macroblock) in MPEG-2/AVC-H.264, or CU ("coding unit" or encoding unit) in HEVC-H.265) of each image of a video sequence, one of the encoding steps consist of a prediction step, for which the encoder must optimally select a block prediction mode from amongst at least two block prediction modes.

In the example of FIG. 6, the decision module 100 controls the prediction circuit 600', especially by sending the output decision DS6 to the selection module 6 so that this module selects one of the three prediction modules 4, 5 and 63, i.e. selects a block prediction mode from amongst three possible block prediction modes: the intra mode, the inter mode and the skip mode.

In other words, for the selection module 6, the decision module 100 selects an encoding parameter which is a block prediction mode from amongst the three possible block prediction modes mentioned here above.

The intra mode uses a spatial variation (intra image) as reference samples for the prediction and necessitates the transmission of the quantized transformed residues plus secondary information (for example index of the intra prediction mode, etc.).

The inter mode uses temporal references for the prediction, i.e. motion-compensated blocks in using the motion vectors (MV) coming from the motion estimation module (ME) 64 and necessitates the transmission of the quantized transformed residues plus secondary information (for example MV(s), indices of the reference images, indices of the motion vector predictors, etc.).

The skip mode uses a temporal reference for prediction, i.e. motion-compensated blocks in using the motion vectors MV(s) coming from the standardized list of motion predictors, and requires only the transmission of secondary information (for example indices of the motion predictors). No residual sample is transmitted.

In addition, it is important to note that in the MPEG standards, three types of images (or pictures or frames) are distinguished in particular:

I image or I-frame: image encoded by using an Intra prediction and without any reference to other images previously encoded; images formed uniquely by encoded blocks with the Intra mode.

P image or P-frame: image known as a predictive image encoded by using an intra prediction or Inter prediction where inter prediction is a one-way temporal prediction made from a previously encoded reference image belonging to the past in the order of display; an image potentially formed by blocks encoded in intra, inter or skip modes.

B image or B-frame: image called a bi-predictive image, encoded by using an intra prediction or inter prediction where the inter prediction is the bidirectional temporal prediction achieved on the basis of one or more reference images belonging to the past and/or to the future in the order of display; this image being potentially formed by blocks encoded in intra mode, inter mode or skip mode.

By way of an illustration, we now present a special application of the decision module 100 of FIG. 6 to select the optimal block prediction mode (for setting up the optimal encoding parameters) to be sent to the selection module 6 for a current block B of an image P.

We therefore consider the selection module 6 and the set of associated encoding parameters (i.e. the set of possible block prediction modes), M={Intra,Inter,Skip}. The decision module 100 is based on the decision model presented further above with reference to FIG. 2. The optimal encoding parameter $m_{opt}$ for the block B is the one that minimizes:

$$\begin{cases} m_{opt} = \underset{m \in M}{\operatorname{argmin}}(J_m) \\ J_m = SSD(s, \hat{s}_m) + \mu \times SSD(\hat{s}_N, \hat{s}_m) + \lambda \times R(\tilde{c}_m, \rho_m) \end{cases} \quad (3)$$

where the sum of the squared differences (SSD) is used as a distortion metric for D and D'. The Lagrange multipliers μ and λ belong to $\mathbb{R}^+$ and are defined as a function of the quantization parameter (QP).

For each of the three possible block prediction modes (i.e. each of the three possible encoding parameters), a neighborhood of reconstructed samples referenced N is constructed:

for the intra mode, the neighborhood N is formed by preceding reconstructed blocks, namely the collocated block ($B^{t_0}$), belonging to the closest (i.e. temporally closest to the current image) encoded reference image (the preceding encoded image); and the top block ($B^{s_0}$) and left block ($B^{s_1}$), spatially adjacent to the current block B to be encoded.

for the inter mode, the neighborhood N is formed by preceding reconstructed blocks, namely: the motion-compensated block ($B^{t_1}$), belonging to the closest (i.e. temporally closest to the current image) reference encoded image (preceding encoded image) in using the motion vector (MV) provided by the motion estimation module (ME) and top block ($B^{s_0}$) and left block ($B^{s_1}$), spatially adjacent to the current block to be encoded B.

for the skip mode, the neighborhood N is formed by preceding reconstructed blocks, namely: the motion-compensated block ($B^{t_2}$), belonging to the closest (i.e. temporally closest to the current image) reference encoded image (previous encoded image), in using the motion vector (MV) provided by a standardized list of MV predictors; and top block ($B^{s_0}$) and left block ($B^{s_1}$), spatially adjacent to the current block to be encoded B.

Consequently, $SSD(\hat{s}_N, \hat{s}_m)$ is defined as a weighted sum of SSD (also called "weighted sum of intermediate distortion measurements") such that:

$$SSD(\hat{s}_N, \hat{s}_m) = \frac{\begin{array}{c} w_m^{t_0} \times SSD(\hat{s}^{B^{t_0}}, \hat{s}_m) + w_m^{t_1} \times SSD(\hat{s}^{B^{t_1}}, \hat{s}_m) + \\ w_m^{t_2} \times SSD(\hat{s}^{B^{t_2}}, \hat{s}_m) + w_m^{s_0} \times SSD(\hat{s}^{B^{s_0}}, \hat{s}_m) + \\ w_m^{s_1} \times SSD(\hat{s}^{B^{s_1}}, \hat{s}_m) \end{array}}{\sum_i w_m^{t_i} + \sum_j w_m^{s_j}}$$

where:
$\{w_m^{t_i}\} \in \mathbb{R}^+$ are factors of weighting for the mode m and the reconstructed temporal reference sample blocks $\{B^{t_i}\}$
$\{w_m^{s_j}\} \in \mathbb{R}^+$ are weighting factors for the mode m and the reconstructed spatial reference sample blocks $\{B^{s_j}\}$.

In particular, it will be noted that:
in intra mode: $w_{intra}^{t_1} = w_{intra}^{t_2} = 0$
in inter mode: $w_{inter}^{t_0} = w_{inter}^{t_2} = 0$
in skip mode: $w_{skip}^{t_0} = w_{skip}^{t_1} = 0$, et $SSD(\hat{s}^{B^{t_2}}, \hat{s}_{skip}) = 0$ Then, for each possible block prediction mode (i.e. for each of the three possible encoding parameters), the decision module 100 computes the associated Lagrange cost $J_m$ by computing each of the three terms of the equation (3). Finally, the decision module 100, selects, for the current block to be encoded B, the block prediction mode that minimizes the Lagrange cost function J.

By way of an illustration, we shall now present another particular application of the decision module 100 of FIG. 6 for selecting the optimal block prediction mode (i.e. the optimal encoding parameter) to be sent to the selection mode 6 for a current block B of an image B.

The same decision process as in the case of an image P is implemented; only the construction of the neighborhood N for each possible block prediction mode (i.e. for each of the three possible encoding parameters) is different, such that:

for the intra mode, the neighborhood N is formed by preceding reconstructed blocks, namely: bidirectional collocated blocks belonging to the closest (temporally closest to the current image, in the past and/or future in the sense of the order of display) reference encoding images (preceding encoded images); and top and left blocks spatially adjacent to the current block B.

for the inter mode, the neighborhood N is formed by preceding reconstructed blocks, namely: bidirectional motion-compensated blocks belonging to the closest (temporally closest to the current block, in the past and/or future in the sense of the order of display) encoded reference images (previously encoded images), in using the MVs provided by the module ME; and top and left blocks spatially adjacent to the current block B.

for the skip mode, the neighborhood N is formed by preceding reconstructed blocks, namely: bidirectional motion-compensated blocks belonging to the closest reference encoded images (temporally closest to the current image, in the past and/or future in the sense of the order of display), in using the MVs provided by a standardized list of predictors of MV, and top and left blocks spatially adjacent to the current block B.

FIG. 7 presents the structure of the decision module 100 (also called the encoding parameters selection device) according to one particular embodiment of the disclosure.

The decision module 100 comprises a random-access memory 73 (for example a RAM), a processing unit 72 equipped for example with a processor, and driven by a computer program stored in a read-only memory 71 (for example a ROM or a hard disk drive). At initialization, the code instructions of the computer program are for example loaded into the random-access memory 73 and then executed by the processor of the processing unit 72. The processing unit inputs the optimizing criteria ("MIN(D (s,ŝ))", "R=R$_T$" and "D'(ŝ$_N$,ŝ)≤D'$_T$"). It outputs (75) the output decisions DS0 to DS6 according to the instructions of the program.

This FIG. 7 illustrates only one particular way, amongst several possible ways, of making the decision module device 100. Indeed, the technique of the disclosure can be carried out equally well:

- on a reprogrammable computing machine (a PC computer, a DSP processor or a microcontroller) executing a program comprising a sequence of instructions, or
- on a dedicated computation machine (for example a set of logic gates such as a FPGA or an ASIC or any other hardware module).

Should the disclosure be implanted on a reprogrammable computing machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

At least one embodiment of the disclosure improves the efficiency of compression of a video encoder and the perceived visual quality of the resulting encoded video sequences, in proposing an innovative decision model to optimize the taking of encoding decisions. It may be recalled that taking a decision consists, for a decision module included in the video encoder, in selecting at least one encoding parameter for at least one of the encoding modules.

At least one embodiment of the disclosure provides a technique that is simple to implement and costs little.

What is claimed is:

1. A method comprising:
   selection by a device, for a current image portion to be encoded and for at least one encoding module included in a video encoder, of at least one encoding parameter from amongst a set of encoding parameters available for said at least one encoding module, the selection being based on a decision model defining a minimization, under a rate constraint, of a first measurement of distortion D between source samples, included in said current image portion to be encoded, and current reconstructed samples, included in a current reconstructed image portion, obtained from the current image portion to be encoded; and
   wherein the decision model defines said minimization under an additional temporal smoothness constraint, pertaining to a second measurement of distortion D' between said current reconstructed samples and preceding reconstructed samples, belonging to a temporal reference neighborhood comprising at least one preceding reconstructed image portion obtained from at least one preceding encoded image portion, and
   wherein said additional temporal smoothness constraint, pertaining to the second measurement of distortion D', is defined by: D'(ŝ$_N$,ŝ)≤D'$_T$, with D'$_T$ being a predetermined threshold, ŝ being the current reconstructed samples, and ŝ$_N$ being the preceding reconstructed samples.

2. The method according to claim 1, wherein the decision model defines said minimization as follows, by means of the Lagrange multiplier method:
   for each portion of each image, for at least one encoding module and one set of encoding parameters M={m$_i$}, i∈{0,K−1},K≥2 associated with this encoding module, a search is made for the optimal encoding parameter m$_{opt}$ which minimizes:

$$\begin{cases} m_{opt} = \underset{m \in M}{\operatorname{argmin}}(J_m) \\ J_m = D(s, \hat{s}_m) + \mu \times D'(\hat{s}_N, \hat{s}_m) + \lambda \times R(\tilde{c}_m, \rho_m) \end{cases}$$

where:
   $D(s,\hat{s}_m)$ is a measurement of distortion between source samples, s, and current reconstructed samples, $\hat{s}_m$, for the encoding parameter m;
   $D'(\hat{s}_N,\hat{s}_m)$ is a measurement of distortion between preceding reconstructed samples, $\hat{s}_N$, belonging to a temporal reference neighborhood, N, and the current reconstructed samples, $\hat{s}_m$, for the encoding parameter m;
   $R(\tilde{c}_m,\rho_m)$ is an estimation of a cost in bits of quantized transformed residues, $\tilde{c}_m$, and of a secondary piece of information, $\rho_m$, to be transmitted to a decoder for the encoding parameter m;
   μ is a first Lagrange multiplier defining a trade-off between $D(s,\hat{s}_m)$ and $D'(\hat{s}_N,\hat{s}_m)$; and
   λ is a second Lagrange multiplier, defining a trade-off between $D(s,\hat{s}_m)$ and $D'(\hat{s}_N,\hat{s}_m)$ on the one hand and $R(\tilde{c}_m,\rho_m)$ on the other hand.

3. The method according to claim 1, wherein said at least one encoding parameter belongs to the group consisting of:
   a size or a type of transform applied to residual samples if said at least one encoding module is a transformation module;
   parameters of quantization if said at least one encoding module is a quantization module;
   a type of entropy encoding if said at least one encoding module is an entropy encoding module;
   loop filtering parameters if said at least one encoding module is a loop filtering module;
   an intra prediction mode if said at least one encoding module is an intra prediction module;
   motion vectors and/or motion predictors if said at least one encoding module is an inter prediction module;
   a mode of prediction and/or a size of prediction unit if said at least one encoding module is a selection module for selection from amongst several prediction modules.

4. The method according to claim 1, wherein the reference neighborhood comprises at least one preceding reconstructed image portion belonging to the group consisting of:
   at least one first preceding reconstructed image portion obtained from a preceding encoded image portion which, in a first preceding encoded image, occupies a position identical to that of the current image portion to be encoded in a current image to be encoded;
   at least one second preceding reconstructed image portion which, in said first preceding encoded image, occupies a position adjacent to that of said at least one first preceding reconstructed image portion;
   at least one third preceding reconstructed image portion obtained from a motion-compensated image portion which, in a second preceding encoded image portion, occupies a motion-compensated position, by means of a motion vector, relative to the position of the current image portion to be encoded in a current image to be encoded;
   at least one fourth preceding reconstructed image portion which, in the second preceding encoded image portion, occupies a position adjacent to that of said at least one third preceding reconstructed image portion.

5. The method according to claim 1, wherein the reference neighborhood comprises at least two preceding reconstructed image portions and the second measurement of distortion D' is defined as a weighted sum of a plurality of intermediate distortion measurements, each intermediate distortion measurement being associated with one of said at least two preceding reconstructed image portions and being defined as a measurement of distortion between said current reconstructed samples included in the current reconstructed image portion and preceding reconstructed samples belonging to the preceding reconstructed image portion associated with said intermediate distortion measurement.

6. The method according to claim 5, wherein said weighted sum is defined by a set of weighting coefficients that is variable from one encoding parameter to another within said set of available encoding parameters for said at least one encoding module.

7. A non-transitory computer-readable carrier medium storing a computer program comprising program code instructions which, when executed on a computer or a processor, configure the computer or processor to implement a method comprising:

selection, for a current image portion to be encoded and for at least one encoding module included in a video encoder, of at least one encoding parameter from amongst a set of encoding parameters available for said at least one encoding module, the method being based on a decision model defining a minimization, under a rate constraint, of a first measurement of distortion D between source samples, included in said current image portion to be encoded, and current reconstructed samples, included in a current reconstructed image portion, obtained from the current image portion to be encoded;

wherein the decision model defines said minimization under an additional temporal smoothness constraint, pertaining to a second measurement of distortion D' between said current reconstructed samples and preceding reconstructed samples, belonging to a temporal reference neighborhood comprising at least one preceding reconstructed image portion obtained from at least one preceding encoded image portion, and wherein said additional temporal smoothness constraint, pertaining to the second measurement of distortion D', is defined by: $D'(\hat{s}_N, \hat{s}) \leq D'_T$, with $D'_T$ being a predetermined threshold, $\hat{s}$ being the current reconstructed samples, and $\hat{s}_N$ being the preceding reconstructed samples.

8. A device comprising:

means for selecting, for a current image portion to be encoded and for at least one encoding module included in a video encoder, at least one encoding parameter from amongst a set of encoding parameters available for said at least one encoding module, the means for selecting comprising:

means for implementing a decision model defining a minimization, under a rate constraint, of a first measurement of distortion D between source samples, included in said current image portion to be encoded, and current reconstructed samples, included in a current reconstructed image portion obtained from the current image portion to be encoded, wherein said means for implementing the decision model define said minimization under an additional temporal smoothness constraint relating to a second measurement of distortion D' between said current reconstructed samples and preceding reconstructed samples belonging to a temporal reference neighborhood comprising at least one preceding reconstructed image portion obtained from at least one preceding encoded image portion and wherein said additional temporal smoothness constraint, relating to the second measurement of distortion D', is defined by: $D'(\hat{s}_N, \hat{s}) \leq D'_T$, with $D'_T$ being a predetermined threshold, $\hat{s}$ being the current reconstructed samples, and $\hat{s}_N$ being the preceding reconstructed samples.

* * * * *